(12) United States Patent
Jain et al.

(10) Patent No.: US 8,694,664 B2
(45) Date of Patent: Apr. 8, 2014

(54) ACTIVE-ACTIVE MULTI-HOMING SUPPORT FOR OVERLAY TRANSPORT PROTOCOL

(75) Inventors: Saurabh Jain, Fremont, CA (US);
Sanjay Sane, Fremont, CA (US);
Sameer Merchant, San Jose, CA (US);
Chandan Mishra, Sunnyvale, CA (US);
Hasmit Grover, Fremont, CA (US);
Dhananjaya Rao, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 343 days.

(21) Appl. No.: 12/952,790

(22) Filed: Nov. 23, 2010

(65) Prior Publication Data

US 2012/0131216 A1    May 24, 2012

(51) Int. Cl.
*G06F 15/16* (2006.01)
(52) U.S. Cl.
USPC .......................................... 709/230; 370/465
(58) Field of Classification Search
USPC ......... 709/201, 204, 205, 217, 218, 219, 230, 709/238, 242, 243, 249; 370/465, 466, 469
See application file for complete search history.

(56) References Cited

U.S. PATENT DOCUMENTS

| | | | |
|---|---|---|---|
| 6,856,991 | B1 | 2/2005 | Srivastava |
| 7,159,034 | B1 | 1/2007 | Rai |
| 7,483,387 | B2 | 1/2009 | Guichard et al. |
| 2003/0026260 | A1 | 2/2003 | Ogasawara et al. |
| 2003/0112799 | A1 | 6/2003 | Chandra et al. |
| 2003/0142685 | A1 | 7/2003 | Bare |
| 2003/0225887 | A1 | 12/2003 | Purnadi et al. |
| 2005/0083955 | A1 | 4/2005 | Guichard et al. |
| 2005/0141499 | A1* | 6/2005 | Ma et al. ........................ 370/389 |
| 2005/0149531 | A1 | 7/2005 | Srivastava |

(Continued)

FOREIGN PATENT DOCUMENTS

| | | | |
|---|---|---|---|
| EP | 1124398 A1 * | 8/2001 | |
| EP | 2197129 A2 * | 6/2010 | |

(Continued)

OTHER PUBLICATIONS

Chiruvolu et al., "Issues and Approaches on Extending Ethernet Beyond LANs," IEEE Communications Magazine, Mar. 2004, pp. 80-86.

(Continued)

*Primary Examiner* — Kostas Katsikis
(74) *Attorney, Agent, or Firm* — Edell, Shapiro & Finnan, LLC

(57) ABSTRACT

Techniques are provided for two peer edge switches in an edge switch cluster of a first data center site to actively provide traffic flow redundancy in an active-active configuration and provide multi-homing support over an overlay transport virtualization (OTV) protocol. Information is stored indicating a media access control (MAC) address of at least one endpoint device at the first site. An edge switch in the edge switch cluster at the first site sends via an OTV protocol a Layer-3 message that is configured to advertise the MAC address of the at least one endpoint at the first site to enable at least one edge switch at a second site to perform multipath routing to the endpoint device at the first site based on each of the edge switches in the edge switch cluster at the first site.

25 Claims, 12 Drawing Sheets

(56) References Cited

U.S. PATENT DOCUMENTS

| | | |
|---|---|---|
| 2005/0163146 A1 | 7/2005 | Ota et al. |
| 2005/0283531 A1 | 12/2005 | Chen et al. |
| 2006/0002299 A1* | 1/2006 | Mushtaq et al. .............. 370/236 |
| 2006/0159083 A1 | 7/2006 | Ward et al. |
| 2006/0198323 A1 | 9/2006 | Finn |
| 2006/0209831 A1 | 9/2006 | Shepherd et al. |
| 2007/0076732 A1 | 4/2007 | Kim |
| 2007/0121486 A1* | 5/2007 | Guichard et al. ............. 370/216 |
| 2007/0189221 A1 | 8/2007 | Isobe et al. |
| 2007/0264997 A1 | 11/2007 | Chaudhary et al. |
| 2008/0120176 A1 | 5/2008 | Batni et al. |
| 2008/0304412 A1* | 12/2008 | Schine et al. ................ 370/235 |
| 2008/0304476 A1 | 12/2008 | Pirbhai et al. |
| 2009/0037607 A1* | 2/2009 | Farinacci et al. ............. 709/249 |
| 2009/0083403 A1* | 3/2009 | Xu et al. ....................... 709/220 |
| 2010/0020806 A1* | 1/2010 | Vahdat et al. ............ 370/395.31 |
| 2011/0110370 A1* | 5/2011 | Moreno et al. ................ 370/392 |
| 2011/0310729 A1* | 12/2011 | Raman et al. ................ 370/225 |

FOREIGN PATENT DOCUMENTS

| | | |
|---|---|---|
| WO | WO 2007027658 A2 * | 3/2007 |
| WO | WO 2009021238 A1 * | 2/2009 |
| WO | WO 2010111142 A1 * | 9/2010 |

OTHER PUBLICATIONS

Housley et al., "EtherIP: Tunneling Ethernet Frames in IP Datagrams," IETF RFC 3378, Sep. 2002.
Rosen et al., "BGP/MPLS VPNs," IETF RFC 2547, Mar. 1999.

* cited by examiner

OTV Cluster-ID1
DCE - 1

Logical Topology in DCE-ISIS

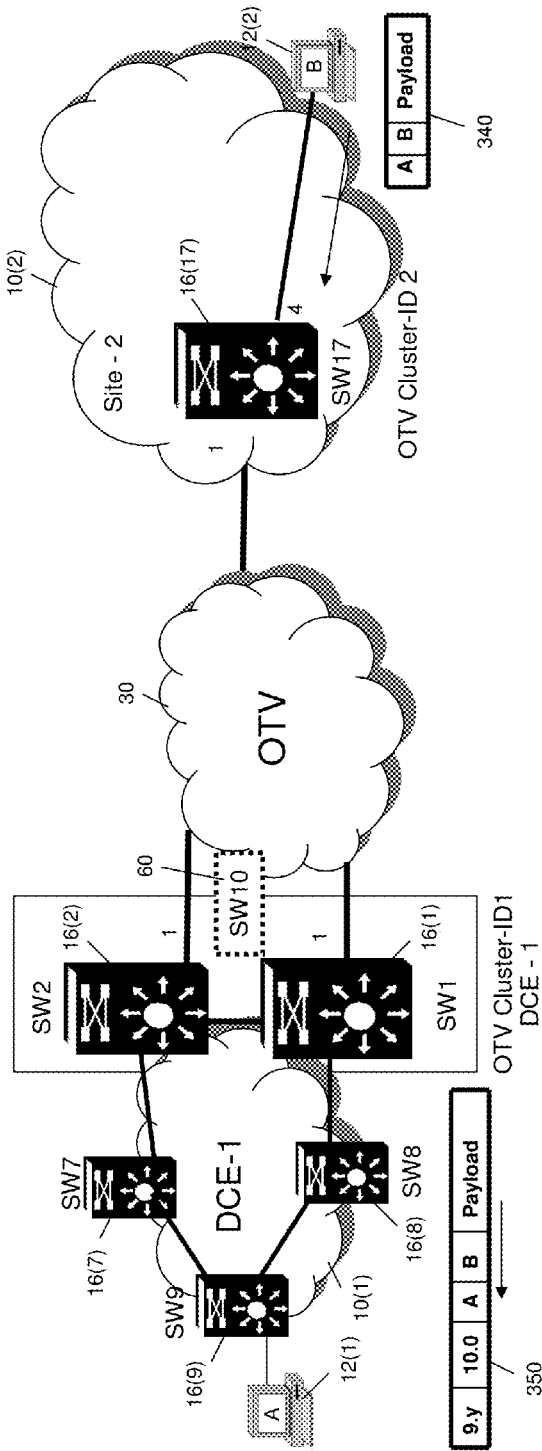
FIG. 12
FIG. 13
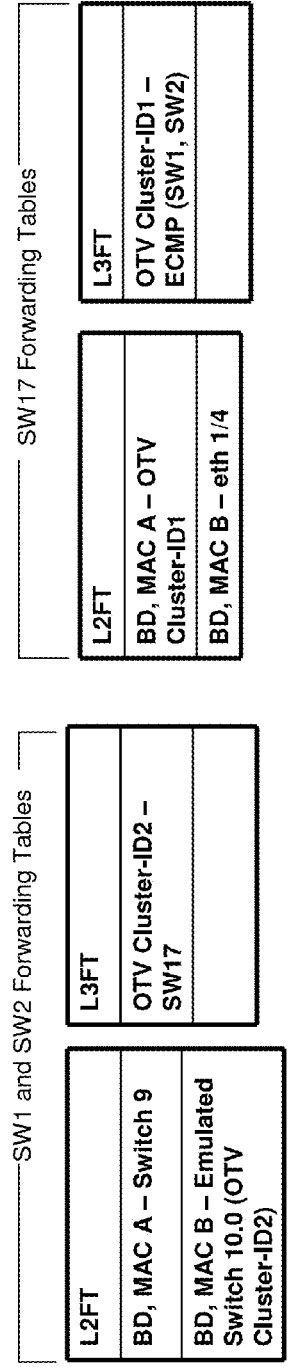
FIG. 14

ACTIVE-ACTIVE MULTI-HOMING SUPPORT FOR OVERLAY TRANSPORT PROTOCOL

TECHNICAL FIELD

The present disclosure relates to data center network connectivity.

BACKGROUND

An Overlay Transport Virtualization (OTV) protocol has been developed to connect a Layer-2 network domain that spans across multiple data centers. The OTV protocol uses a "MAC-in-Internet Protocol (IP)" encapsulation technique to provide Layer-2 Virtual Private Network (VPN) solutions and extend the Layer-2 domain over an IP network. Since the OTV protocol uses IP, it does not require any pseudo-wire or tunnel maintenance and provides a multi-point connectivity using any available transport.

In a multi-homed topology where IP connectivity can be by more than one edge device at a site, the OTV protocol supports only a per-virtual local area network (VLAN) load-balancing. For a given VLAN, only one of the OTV edge switches forwards the packet in and out of the network. This works well for a typical Spanning Tree Protocol (STP) deployment, since the STP always blocks one of the redundant paths in a VLAN. However, in topologies that use Virtual Port Channel (vPC) and Data Center Ethernet (DCE), each of which supports multiple paths to reach a destination and per-flow load-balancing, active-active multi-homing support for OTV within a VLAN is needed.

BRIEF DESCRIPTION OF THE DRAWINGS

FIG. 12 is an example of a network diagram showing a data center site with an edge switch cluster similar to that shown in FIG. 10 and depicting a packet flow from another site to the data center site with the edge switch cluster having the fictitious switch.

FIGS. 13 and 14 are examples of Layer-2 and Layer-3 forwarding tables at the edge switches in the edge switch cluster and at an edge switch at another site for the example packet flow scenario shown in FIG. 12.

DESCRIPTION OF EXAMPLE EMBODIMENTS

Overview

Techniques are provided for active-active multi-homing support over an overlay transport virtualization protocol for an edge switch at a data center site. At an edge switch that is configured to operate in an active-active multi-homing mode with at least one other edge switch in an edge switch cluster at a first data center site that comprises one or more endpoint devices, information is stored indicating a media access control (MAC) address of at least one endpoint device at the first site. The edge switch at the first site communicates with at least one edge switch device at a second site using the overlay transport virtualization protocol that extends Layer-2 network connectivity to Layer-3 network connectivity over Internet Protocol (IP) between edge switches at a plurality of sites. The edge switch in the edge switch cluster at the first site sends via the overlay transport virtualization protocol a Layer-3 message that is configured to advertise the MAC address of the at least one endpoint at the first site to enable the at least one edge switch at the second site to perform multi-path routing to the endpoint device at the first site based on each of the edge switches in the edge switch cluster at the first site. When switches at the data center site operate in accordance with a protocol, such as the Data Center Ethernet (DCE) protocol, then the edge switch in the edge cluster generates an emulated switch identifier representing a fictitious switch that signifies all traffic from other sites sent to the first site using the overlay transport virtualization protocol. The edge switches in the edge switch cluster mark packets received via the overlay transport virtualization protocol from other sites and forward the marked packets to switches at the first site so that the packets appear as if sent from the fictitious switch.

EXAMPLE EMBODIMENTS

Figure 1:
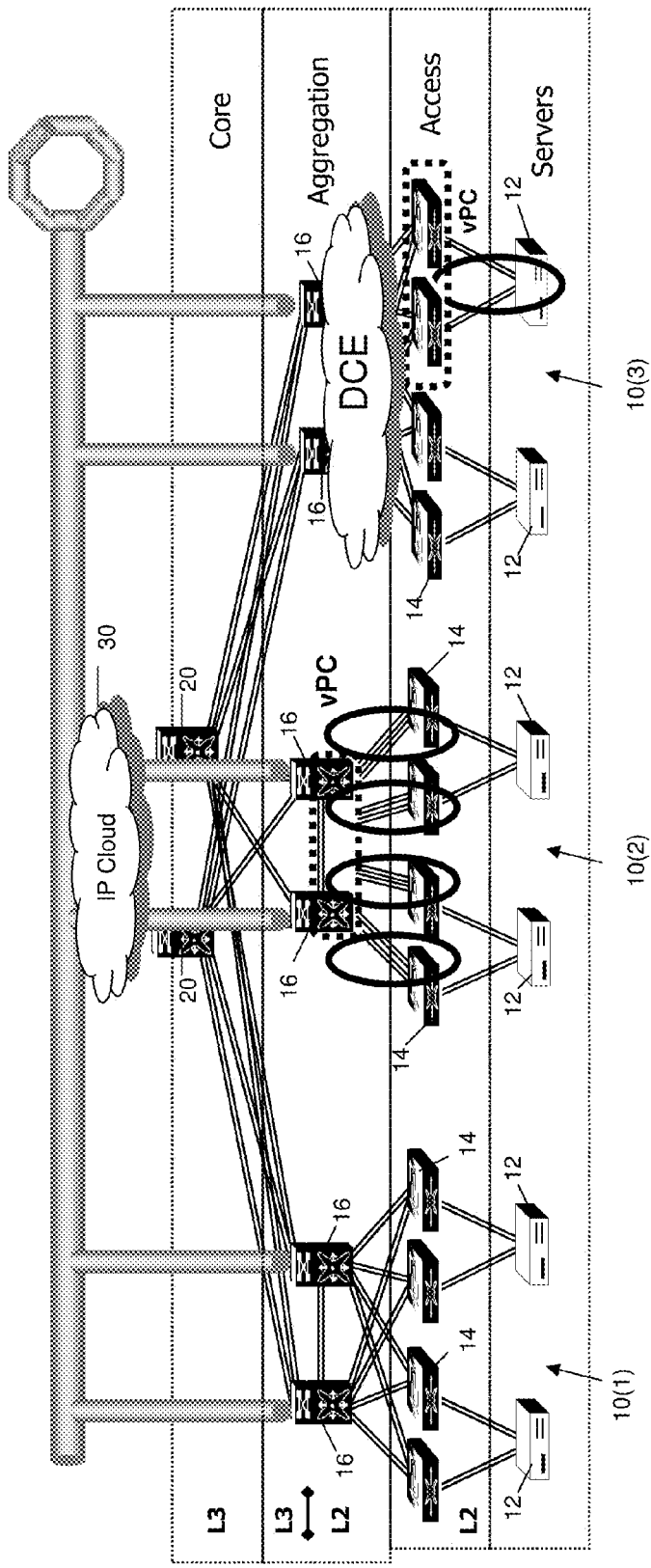
FIG. 1 is an example of a diagram of a network comprising multiple data centers, where edge switches in a data center are configured for active-active multi-homing support for an overlay transport virtualization protocol that extends Layer-2 network connectivity to Layer-3 network connectivity over Internet Protocol (IP) between edge switches at a plurality of data center sites.

Referring first to FIG. 1, a network environment is shown comprising a plurality of data centers 10(1), 10(2) and 10(3) each comprising one or more servers 12, access switches 14, and aggregation switches 16. There are also firewall devices connected to each aggregation switch at each data center but for simplicity these firewall devices are not shown in FIG. 1. The access switches 14 within a data center communicate with each other using Layer-2 network connectivity. The aggregation switches 16 communicate with the access switches 14 at their respective data center using Layer-2 network connectivity but communicate with core switches 20 using Layer-3 network connectivity, and the core switches 20 in turn connect to an Internet Protocol (IP) cloud shown at 30. In addition, the aggregation switches 16 at each data center each have their own Layer-3 connectivity to the IP cloud 30.

When the aggregation switches 16 at a data center use Virtual Port Channel (vPC) techniques or Data Center Ethernet (DCE) techniques with Layer-2 Multipath (L2MP), the Layer-2 segments of each data center is active-active. A vPC is a port channel that can operate between more than two devices. Each vPC is a traditional Layer-2 port channel. Two edge switches are connected through a peer link for the single logical endpoint. These switches are called the vPC peer switches. The vPC peer link consists of a port channel between the two vPC peer switches that provides packet tagging to identify the origination. A Layer-3 link is also setup as a way to test that the remote peer is working. This link is the vPC peer link. Each device connected to a port on the vPC VLANs is called a vPC member port. While multiple devices are used to create the vPC, the terminating device sees vPC as one logical connection.

FIG. 1 shows that the aggregation switches 16 at data center 10(2) are configured to use vPC techniques with respect to traffic to and from the access switches 14 at that data center. In addition, FIG. 1 shows that the access switches 16 are configured to use vPC techniques with respect to traffic to and from a server 12 at data center 10(3).

DCE was developed to provide Ethernet enhancements for the data center bridging standards, and also includes Layer-2 multipathing based on the Transparent Interconnection of Lots of Links (TRILL) protocol. FIG. 1 shows that aggregation switches 16 and access switches 14 use DCE techniques for communicating traffic in the data center 10(3).

As used herein, "active-active" means that two or more edge switches at a data center e.g., aggregation switches 16, both forward packets in and out of the data center for the same virtual location area networks (VLANs), as opposed to "active-standby" in which only one of the switches forwards packets in and out of the data center. Both vPC and DCE techniques allow for per-flow load balancing within a VLAN as well as across VLANs.

It is desirable to extend this paradigm when such Layer-2 domains are extended over IP. This is achieved using active-active multi-homing support for an Overlay Transport Virtualization (OTV) protocol. OTV is a "Media Access Control (MAC) in IP" technique for supporting Layer-2 virtual private networks (VPNs) over any transport. The overlay nature of OTV allows it to work over any transport as long as this transport can forward IP packets. Any optimizations performed for IP in the transport will benefit the OTV encapsulated traffic. OTV can extend the Layer 2 domains across geographically distant data centers by providing built-in filtering capabilities to localize the most common networking protocols (Spanning Tree Protocol, VLAN Trunking Protocol, and Hot Standby Router Protocol HSRP) and prevent them from traversing the overlay, therefore keeping protocol failures from propagating across sites. Unlike traditional Layer-2 VPNs, which rely on Layer-2 flooding to propagate MAC address reachability, OTV uses a protocol to proactively advertise the MAC addresses learned at each site. The protocol advertisement takes place in the background, with no configuration required by the network administrator. The endpoints connected to the network are assumed to be neither silent nor unidirectional. OTV also provides a way to learn the MAC addresses for unidirectional hosts.

OTV is referred to as an "overlay" method of virtualization versus traditional "in-the-network" type systems in which multiple routing and forwarding tables are maintained in every device between a source and a destination. With OTV, state is maintained at the network edges (edge switches at a data center, e.g., aggregation switches 16), but is not required at other devices in a network site or in a core network. OTV operates at edge devices interposed between the network sites and the core network. The edge devices perform Layer-2 learning and forwarding functions (similar to a traditional Layer-2 switch) on their site-facing interfaces (internal interfaces) and perform IP based virtualization functions on their core-facing interfaces, for which an overlay network is created. The dual functionality of the edge device provides the ability to connect Layer-2 networks, Layer-3 networks, or hybrid (Layer-2 and Layer-3) networks together. OTV can also run at the same time as the network sites and the core network are operating "in-the-network" virtualization via VRF (Virtual Routing and Forwarding) or VNET (Virtual Network).

An active-active mechanism for OTV involves a protocol in Layer-2 (L2) network that supports Equal Cost Multiple Paths (ECMP). This ensures that the traffic from the VPN towards the OTV side is load-balanced among the dual-homed edge switches, e.g., aggregation switches 16 at a data center. Examples of such protocols are vPC in Classical Ethernet networks, DCE networks, and the aforementioned TRILL protocol. An OTV authoritative edge device (AED) mechanism is employed to ensure that only one of the edge switches forwards and attracts multicast/broadcast traffic to and from the OTV side (to edge switches at other sites). This ensures that no duplicate multicast and broadcast packets are sent to and received from the OTV side.

Figure 2:
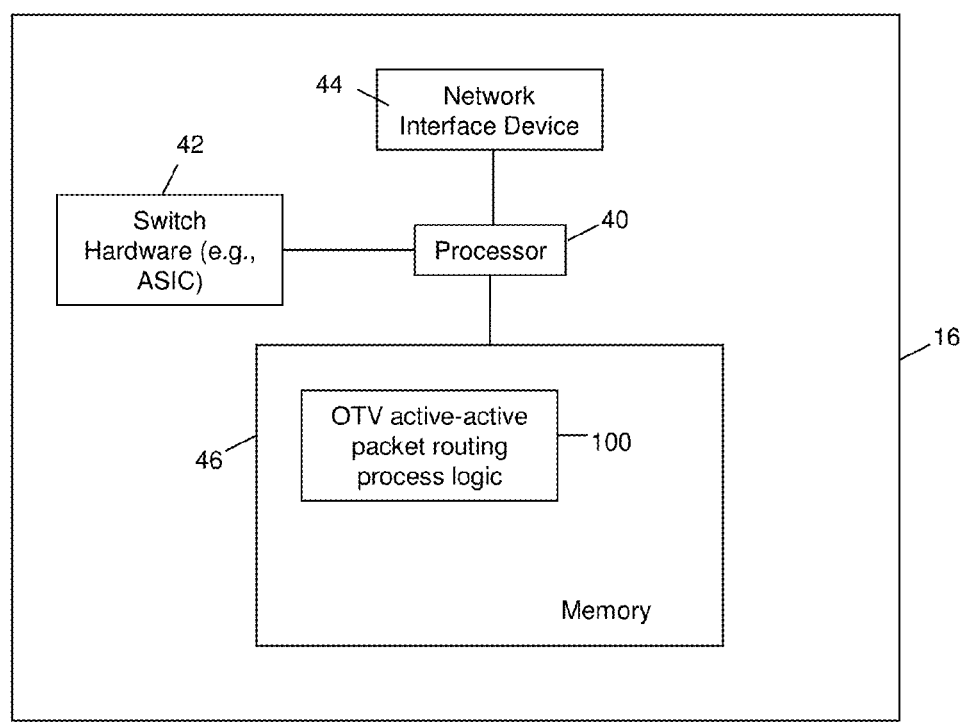
FIG. 2 is an example of a block diagram of an edge switch configured for active-active multi-homing support for the overlay transport virtualization protocol.

Reference is now made to FIG. 2 for a description of an edge switch, e.g., an aggregation switch 16, that is configured to perform operations for active-active multi-homing support for OTV. The edge switch 16 comprises a processor 40, switch hardware 42 comprising one or more application specific integrated circuits (ASICs), a network interface device 44 and memory 46. The processor 40 may be a microprocessor or microcontroller or other similar data processor. The switch hardware 42 comprises digital logic and other circuitry configured to perform the switching/forwarding operations in the Layer-2 network at the data center for the edge switch and in the Layer-3 network (e.g., OTV in the IP cloud 30). The memory 46 may comprise read only memory (ROM), random access memory (RAM), magnetic disk storage media devices, optical storage media devices, flash memory devices, electrical, optical, acoustical or other physical/tangible memory storage devices. The network interface device 44 is, for example, an Ethernet network interface card, that is configured to provide L2 connectivity to access switches in a data center site where the edge switch is located, and also to provide L3 connectivity over IP to other edge switches via OTV.

The memory 46 stores instructions for OTV active-active packet routing process logic 100. Thus, the memory 24 may comprise one or more computer readable storage media encoded with software comprising computer executable instructions and when the software is executed operable to perform the operations described herein for the process logic 100. The processor 40 executes the instructions stored in memory 46 for process logic 100 in order to perform the operations described herein.

As will become more apparent from the foregoing description, the processor 40 generates messages to be transmitted and processes received messages for communication between with at least one edge switch device at another site using the OTV protocol that extends Layer-2 network connectivity to Layer-3 network connectivity over IP between edge switches at a plurality of sites. The processor 40 also generates and sends via the OTV protocol a Layer-3 message that is configured to advertise the MAC address of the at least one endpoint at a first site to enable the at least one edge switch at a second site to perform multipath routing to the endpoint device at the first site based on each of the edge switches in the edge switch cluster at the first site.

Figure 3:
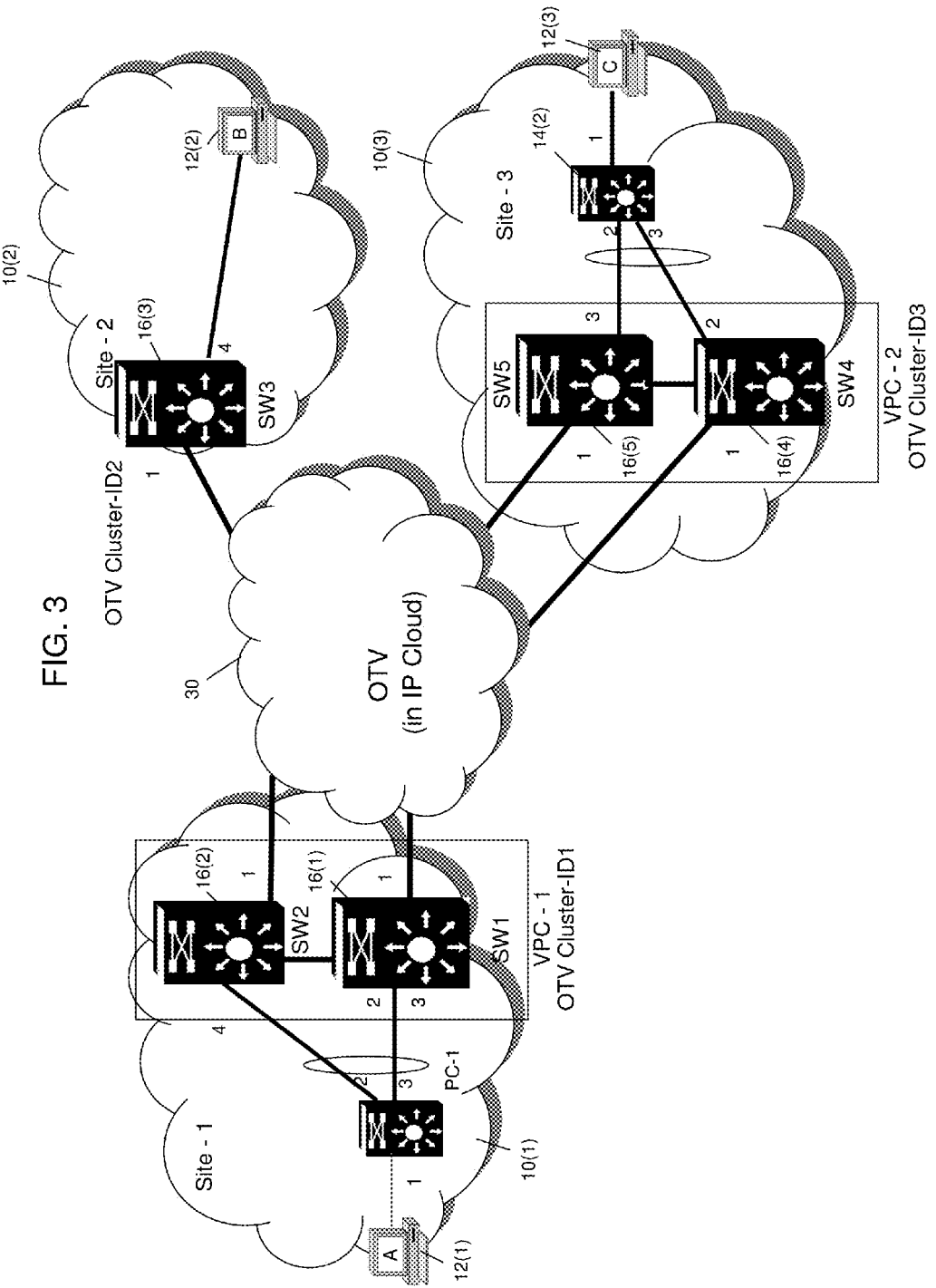
FIG. 3 is an example of a network diagram of a data center site comprising a cluster of edge switches operating as virtual port channel peers and configured to operate in an active-active multi-homing mode with respect to edge switches at other data center sites.

Reference is now made to FIGS. 3-9 for a description of an edge switched configured to execute the process logic 100 to provide active-active multi-homing support for OTV where the protocol for connectivity at a data center site is vPC. Referring first to FIG. 3, a network topology is shown wherein the first data center 10(1), identified as Site-1, comprises edge switches 16(1) and 16(2) and access switch 14(1). There is an endpoint device 12(1) connected to access switch 14(1). Switches 16(1) and 16(2) are also identified as SW1 and SW2, respectively, and are configured as vPC peers with respect to access switch 14(1) and as OTV active-active edge switches. Consequently, both switches 16(1) and 16(2) use the same OTV Cluster-identifier (ID), which in this example is OTV Cluster-ID1. Endpoint device 12(1) has MAC address MAC A.

At data center 10(2), also identified as Site-2, there is an edge switch 16(3) (SW3) that is connected to an endpoint device 12(2). The edge switch 16(3) uses OTV Cluster-ID2. There is an endpoint device 12(2) connected to switch 16(3) at Site-2 that has MAC address MAC B. Moreover, at data center 10(3), also identified as Site-3, there are two edge switches 16(4) (SW4) and 16(5) (SW5) that use OTV Cluster-ID3. Switches 16(4) and 16(5) are configured as vPC peers with respect to access switch 14(2) and as OTV active-active edge switches. Switches 16(4) and 16(5) use OTV Cluster-ID3. There is an endpoint device 12(3) with MAC address MAC C connected to access switch 14(2) at Site-3.

Each of the other remote OTV edge switches 16(3), 16(4) and 16(5) form adjacencies to both edge switches 16(1) and 16(2) for ECMP.

In active-active mode, the process logic 100 on switches 16(1) and 16(2) synchronizes locally learned MAC addresses, e.g., MAC A for endpoint device 12(1), and inserts those MAC addresses in their forwarding tables. In addition, using an OTV control protocol mechanism, e.g., Intermediate System-Intermediate System (IS-IS), on both switches 16(1) and 16(2), the local MAC address, e.g., MAC A of endpoint device 12(1), is advertised behind the same Cluster-ID (e.g., OTV Cluster-ID1), thereby providing for ECMP on remote switches, e.g., switches 16(3)-16(5).

Figure 4:
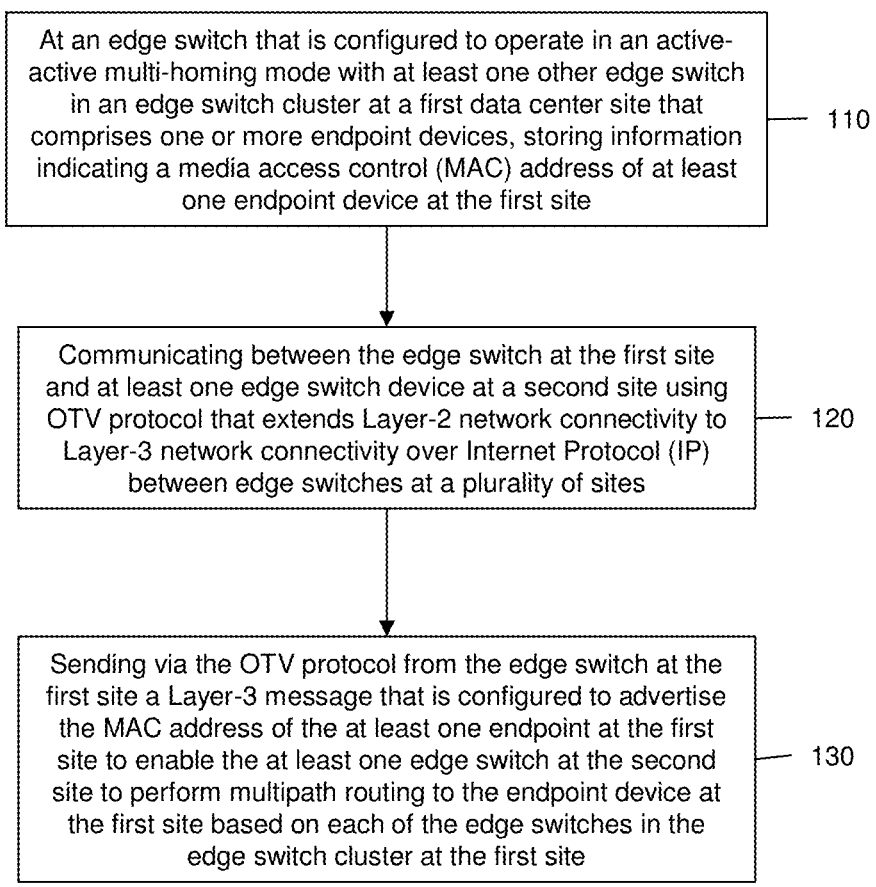
FIG. 4 is an example of a flow chart for operations performed at an edge switch in an edge switch cluster shown in FIG. 3.

Reference now made to FIG. 4 for a description of a flow chart for process logic 100 performed in an edge switch that is part of an OTV Cluster, e.g., OTV Cluster-ID1, in connection with the vPC networking environment as depicted in FIG. 3. At 110, at an edge switch that is configured to operate in an active-active multi-homing mode with at least one other edge switch in a edge switch cluster at a first data center site that comprises one or more endpoint devices, information is stored indicating a media access control (MAC) address of at least one endpoint device at the first site. For example, at site 10(1) in FIG. 3, each of the switches 16(1) and 16(2) in OTV Cluster-ID1 store the MAC address of endpoint device 12(1). At 120, each edge switch in the OTV cluster communicates with at least one edge switch device at a second site using the OTV protocol that extends L2 network connectivity to L3 network connectivity over IP between edge switches at a plurality of sites. In other words, operation 120 is meant to indicate that the edge switches at a plurality of sites are configured to use the OTV protocol. At 130, each edge switch in the edge switch cluster at the first site sends, via the OTV protocol, a L3 message that is configured to advertise the MAC address of the at least one endpoint at the first site to enable at least one edge switch at the second site to perform multipath routing to the endpoint device at the first site based on each of the edge switches in the edge switch cluster at the first site.

Figure 5:
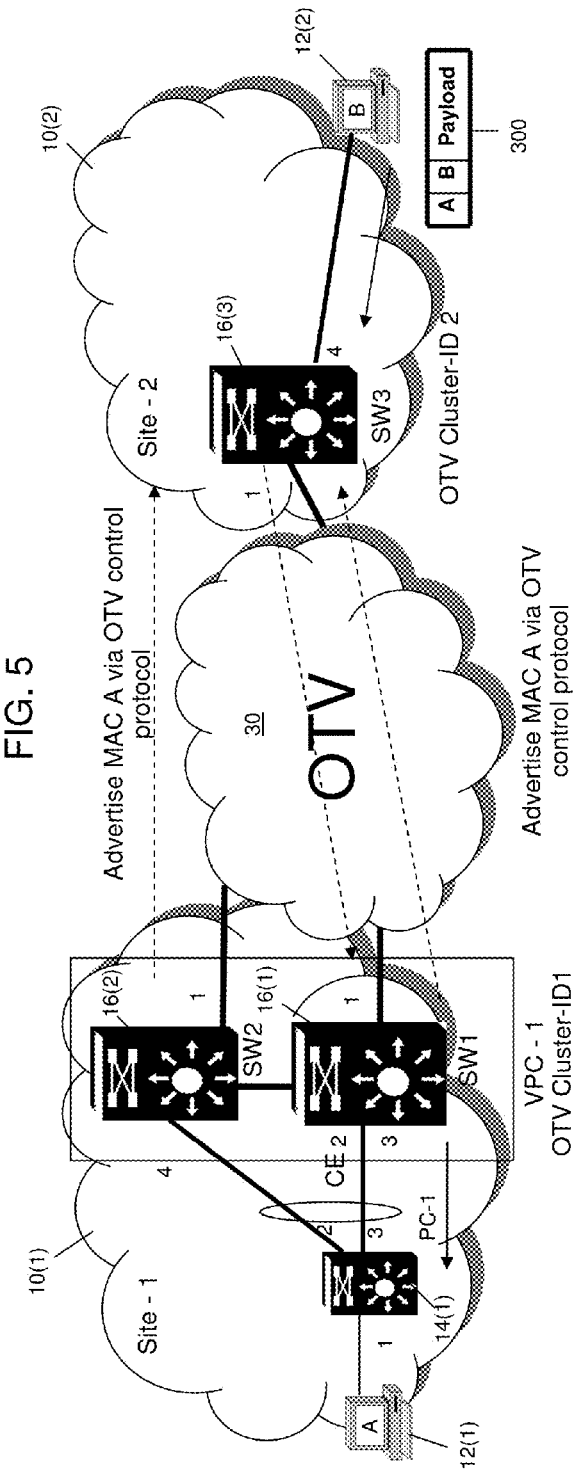
FIG. 5 is a network diagram similar to that shown in FIG. 3 and depicting a packet flow from an edge switch at another site to the edge switch cluster.

Referring now to FIG. 5, a diagram is now described that depicts a unicast packet flow from remote endpoint device 12(2) at Site-2 to endpoint device 12(1) at Site-1. An example of the packet is shown at reference numeral 300. As explained above in connection with FIGS. 3 and 4, both switches 16(1) and 16(2) advertise the MAC address for endpoint device 40, MAC A, via an OTV control protocol (e.g., IS-IS), to remote edge switches, e.g., switch 16(3) at Site-2. In the active-active topology, the remote OTV Cluster-ID, e.g., OTV Cluster-ID2, is reachable by both switches 16(1) and 16(2). Unicast packets sent from switch 16(3) utilize the available ECMPs and packets will be load-balanced to switches 16(1) and 16(2) based on a flow-based hashing computation based on source and destination addresses contained in the headers of the packets. Of the two edge switches 16(1) and 16(2), the switch that receives the packet will decapsulate it and forward it on vPC or other ports in the L2 network within Site-1, e.g., to endpoint device 12(1). Thus, FIG. 5 depicts that an edge switch in the edge switch cluster at the first site receives a L3 packet sent using the OTV protocol from at least one edge switch at another site, e.g., the second site 10(1), decapsulates the L3 packet and forwards the packet on a port in the L2 network at the first site. When the edge switches in the edge switch cluster at the first site are vPC peers that use the same OTV Cluster-ID, then the packet is forwarded on a vPC port in the L2 network at the first site.

Figure 6:
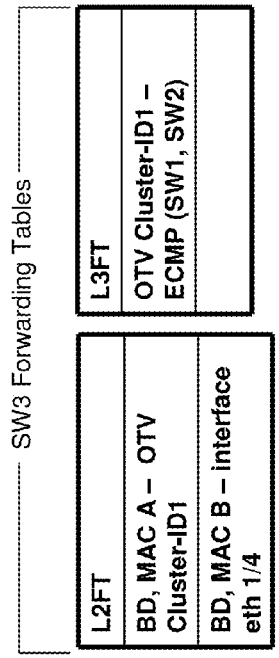
FIGS. 6 and 7 are examples of Layer-2 and Layer-3 forwarding tables at the edge switches in the edge switch cluster and at an edge switch at another site for the example packet flow scenario shown in FIG. 5.
Figure 7:
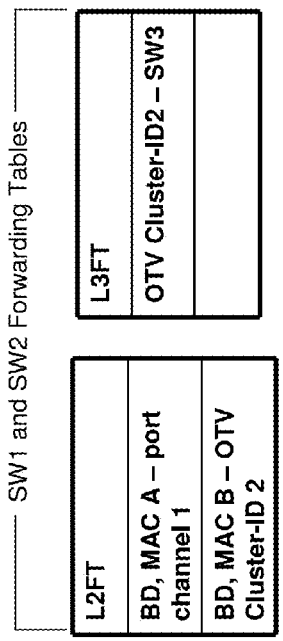

FIGS. 6 and 7 show the L2 Forwarding Tables (FTs) for switches 16(1) and 16(2) at Site-1, where BD indicates Bridge Domain, a generic term for VLAN. The MAC addresses for the endpoint devices 12(1) and 12(2) appear in the L2 FTs and the OTV Cluster-IDs appear in the L3FTs. Switches 16(1) and 16(2) appear as ECMP candidates in the L3FT at switch 16(3). In the L2FT of switch 16(3), the endpoint device 12(2) is on port 4 Ethernet interface of switch 16(3) as noted by the express MAC B-interface eth ¼". Also, MAC A for endpoint device 12(1) is associated with OTV Cluster-ID1 in the L2FT of switch 16(3). Thus, when an edge switch, e.g., edge switch 16(1) in OTV Cluster-ID1, sends a L3 message advertising MAC A of endpoint device 12(1). The message comprises the site identifier (for Site-1) as well as the cluster identifier for the edge switch cluster of which that switch is a part at that site, e.g., OTV Cluster-ID1 for edge switch 16(1) (and 16(2)).

Figure 8:
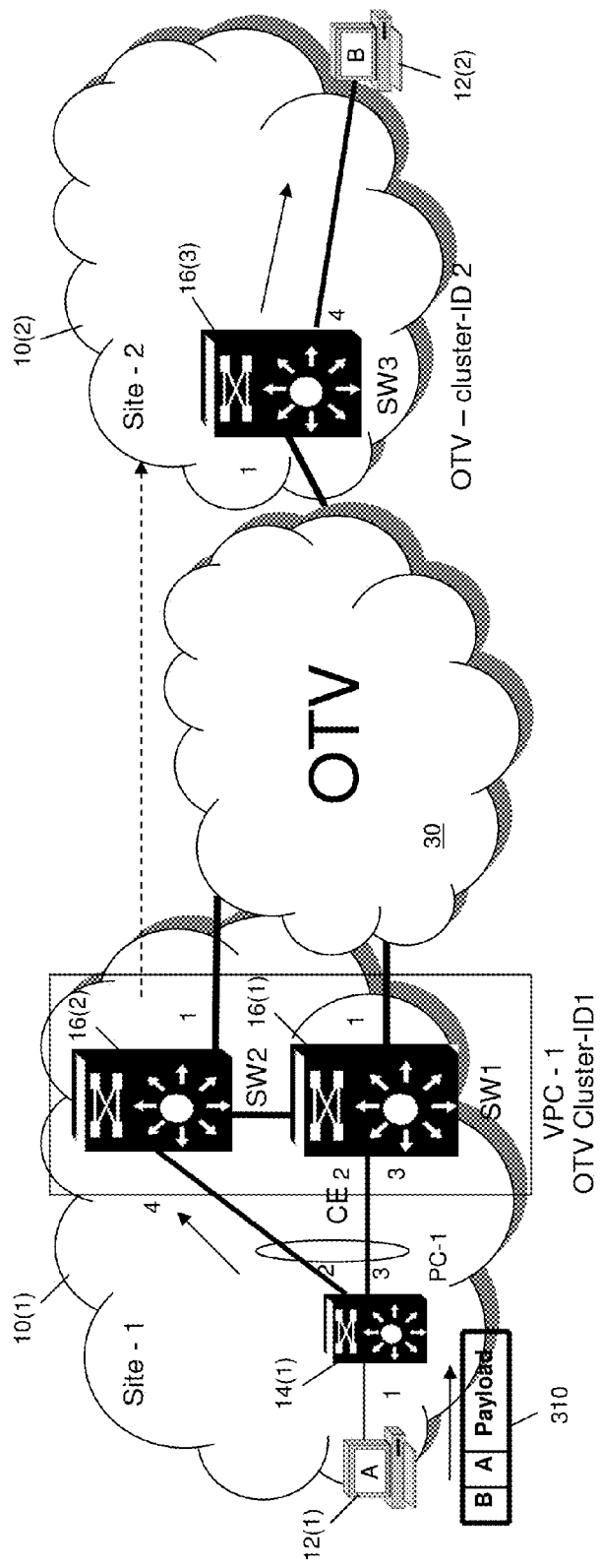
FIG. 8 is an example of a network diagram similar to that shown in FIG. 3 and depicting a packet flow from the edge switch cluster to an edge switch at another site.

Turning now to FIG. 8, a diagram is now described for packet flow from endpoint device 12(1) to endpoint device 12(2). An example of a packet is shown at reference numeral 310. In this example, vPC will load-balance the packet in the L2 domain to one of the switches 16(1) and 16(2). The switch that receives the packet will do a lookup in its forwarding tables and forward it into the OTV cloud 30. Switches 16(1), 16(2) and 16(3) have forwarding tables identical to those shown in FIGS. 6 and 7 for the scenario shown in FIG. 8.

Thus, FIG. 8 depicts that a packet is received at one or the two edge switches in the edge switch cluster at the first site from the at least one endpoint device at the first site, and is forwarded as an L3 message using the OTV protocol to at least one edge switch at another site, e.g., the second site.

Figure 9:
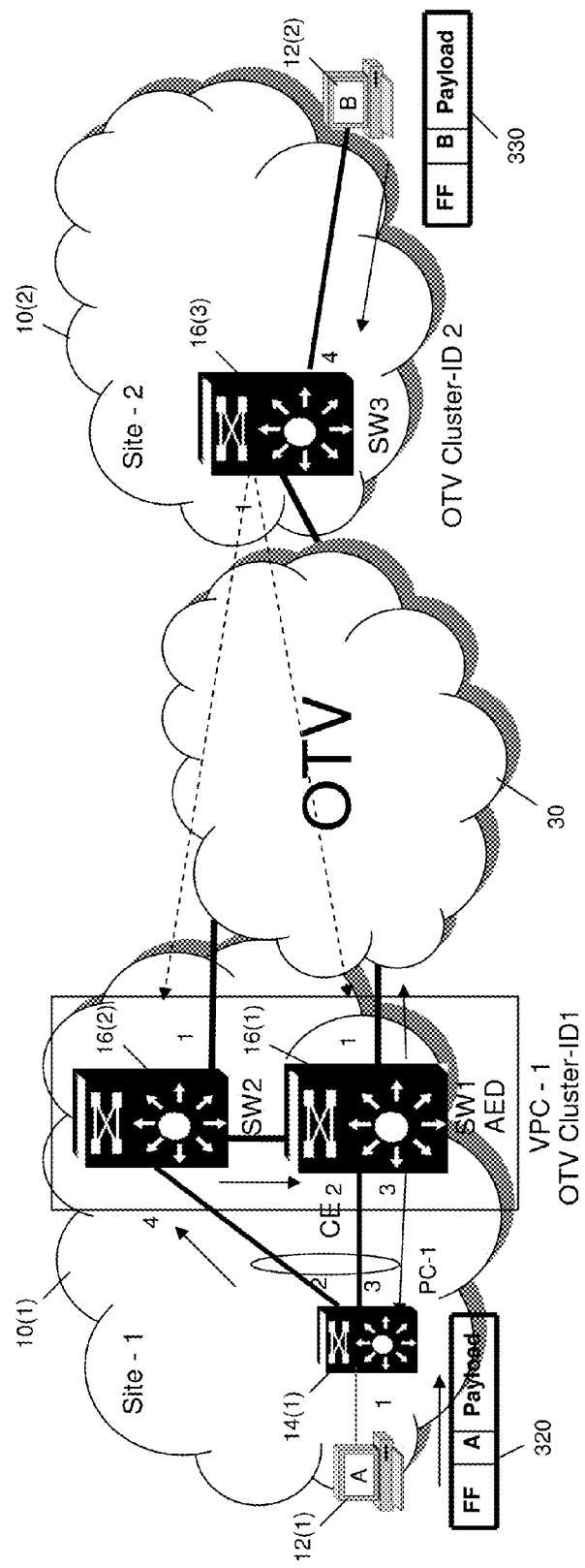
FIG. 9 is an example of a network diagram similar to that shown in FIG. 3 and depicting multi-destination packets sent between data center sites.
Figure 10:
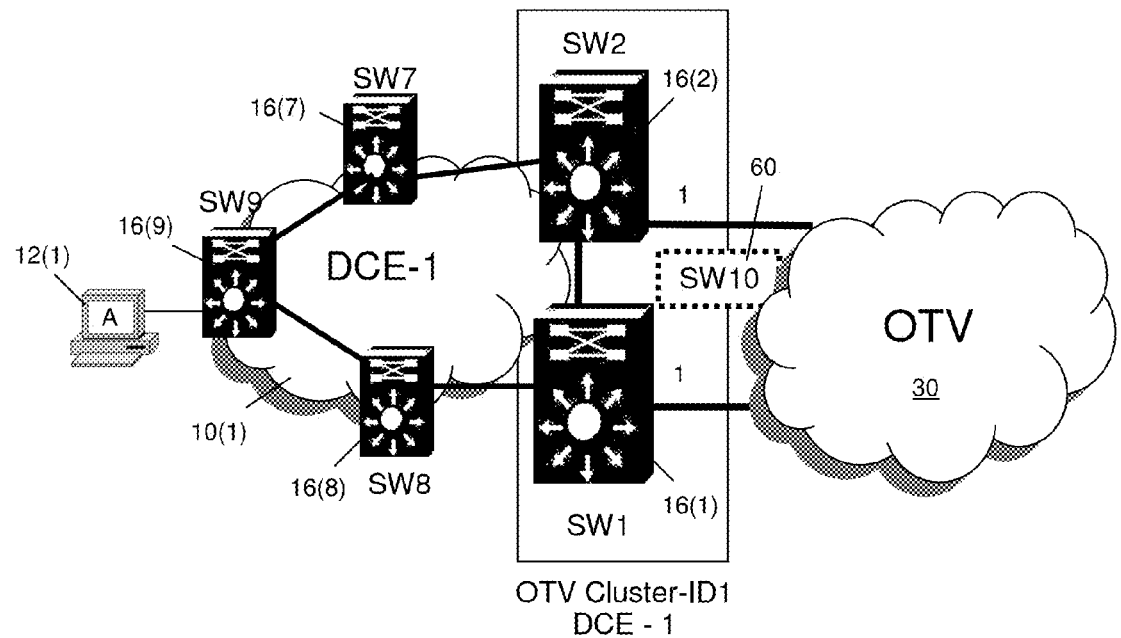
FIG. 10 is an example of a network diagram showing a data center site in which each switch in an edge switch cluster at the site is configured to generate an emulated switch identifier representing a fictitious switch that signifies traffic from other sites sent using the overlay transport virtualization protocol.

Reference is now made to FIG. 9 for a description of packet handling for multi-destination packets. As explained above, both the switches are treated as a single-unit from the OTV perspective. In a dual-homed topology, OTV elects an Authoritative Edge Device (AED) per site for every VLAN. Only the AED switch forwards and receives multi-destination packets to and from the OTV cloud 30. In the example shown in FIG. 9, switch 16(1) is the designated AED switch. A system administrator may designate one of the OTV switches as the AED for a VLAN, or the AED is selected by the switches comparing their MAC addresses and the switch that has the "higher" MAC address is designated as the AED.

Multi-Destination Packets from the L2 Network

For multi-destination packets, e.g., packet 320, from the L2 network to the OTV cloud 30, only one switch of switches 16(1) and 16(2) will receive the multi-destination packet due to STP loop-free topology and vPC. vPC switches always forward multi-destination packets on the vPC peer-link. Therefore, broadcast or multicast packets received from the L2 network side will always reach the AED switch (either through vPC or peer-link). The AED switch forwards the multi-destination packet towards the OTV cloud 30.

Multi-Destination Packets Received from the OTV Cloud

For multicast packets sent from the OTV cloud from another edge switch, e.g., packet 330, only the AED switch joins the Internet Group Management Protocol (IGMP) in L3. As a result, only the AED switch attracts the multi-destination traffic. Broadcast packets from the OTV cloud are received by both edge switches 16(1) and 16(2) but only the switch that is the AED switch forwards it in the L2 network. The STP in vPC breaks the loop in the L2 network and guarantees that the non-AED switch, switch 16(2), does not receive the broadcast packet back. Therefore, there are no learning issues.

An AED switch is selected on a per-VLAN basis for broadcast traffic and on a per-group basis for multicast traffic. For better load-balancing and bandwidth utilization, the following can be divided among the OTV edge switches:

VLANs for broadcast packets; and

Multicast groups for multicast packets.

Distribution of VLANs and multicast groups also reduces traffic disruption when one of the OTV edge switches goes down.

Thus, as depicted in FIG. 9, one of two or more edge switches in the edge switch cluster at a given site is designated as an AED switch for multi-destination traffic to and from that site, e.g., the first site, for each VLAN at that site. An edge switch is designated the AED switch is designated as such on a per VLAN basis for broadcast traffic to and from edge switches at other sites using the OTV protocol for L3 connectivity.

Reference is now made to FIGS. 10-17 for a description of the use of active-active support for DCE scenarios. In a DCE network environment, when configured for OTV active-active support, the OTV edge switches 16(1) and 16(2) at DCE Site-1 each generates a fictitious logical switch (through software) referred to as an "emulated switch" for the DCE network. The emulated switch, shown in dotted lines at reference numeral 60 and with the designation "SW10", is a fictitious or logical switch that signifies all traffic sent other sites to the first site via the OTV cloud 30. All the hosts connected to "remote" OTV sites will be seen by the DCE network as if they are connected to the emulated switch 60. The emulated switch 60 is "emulated" to be directly connected behind the OTV edge switches 16(1) and 16(2) so that the DCE switches can use L2 multipathing towards the OTV cloud 30. Other DCE edge switches at Site-1 are shown at reference numerals 16(7), 16(8) and 16(9). Endpoint device 10 is connected to edge switch 16(9) in this example.

Edge switches on remote OTV sites will form adjacency with both switches 16(1) and 16(2). In the active-active topology, both switches 16(1) and 16(2) advertise the same OTV cluster-ID, e.g., OTV Cluster ID1. Therefore, remote OTV sites will use multipathing towards the DCE enabled site (similar to that described herein for a vPC enabled site).

Figure 11:
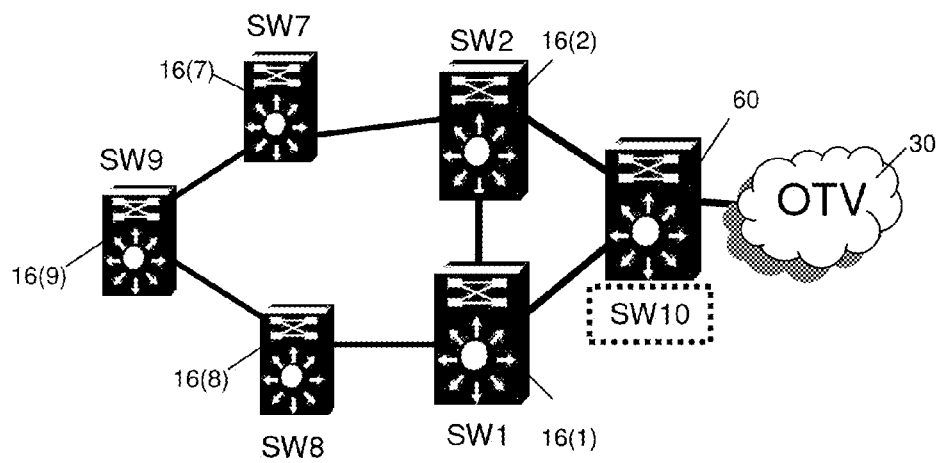
FIG. 11 is an example of a logical network diagram similar to that shown in FIG. 10 and illustrating the fictitious switch.

FIG. 11 shows a logical topology for the DCE scenario. The emulated switch 60 is shown connected between edge switches 16(1) and 16(2) and the OTV cloud 30. It appears to remote OTV sites as a new switch based on data advertised by the edge switches 16(1) and 16(2).

Turning now to FIGS. 12-14, an example of a unicast packet flow from endpoint 12(2) at Site-2 to endpoint 12(1) at Site-1 is described. An example of a packet is shown at reference numeral 340. In this example, endpoint 12(2) is connected to edge switch 16(17), designated SW17 in the figure. In the active-active topology, the remote OTV cluster ID is reachable by both switches 16(1) and 16(2). Unicast packets at switch 16(17) will utilize available ECMPs and packets will be load-balanced to switches 16(1) and 16(2) based on a flow-based hash computation. FIG. 14 shows the ECMP indication in the L3FT for switch 16(17).

All packets from the OTV cloud that are forwarded to the DCE L2 network are marked, by switches 16(1) and 16(2), as if to appear that they are coming from the fictitious switch 60. This ensures that the MAC address MAC B is learned from behind the fictitious switch on the other DCE edge switches, e.g., edge switch 16(9). This is shown by the packet 350 having the header fields with "9.y" and "10.0" to indicate that the packet was sent by switch 60 (SW10) to switch 16(9) (SW9).

As shown in the L2FT of FIG. 13, the OTV control protocol synchronizes and programs the remote OTV MAC addresses behind the emulated switch ID (SW10) on both switches 16(1) and 16(2).

Figure 15:
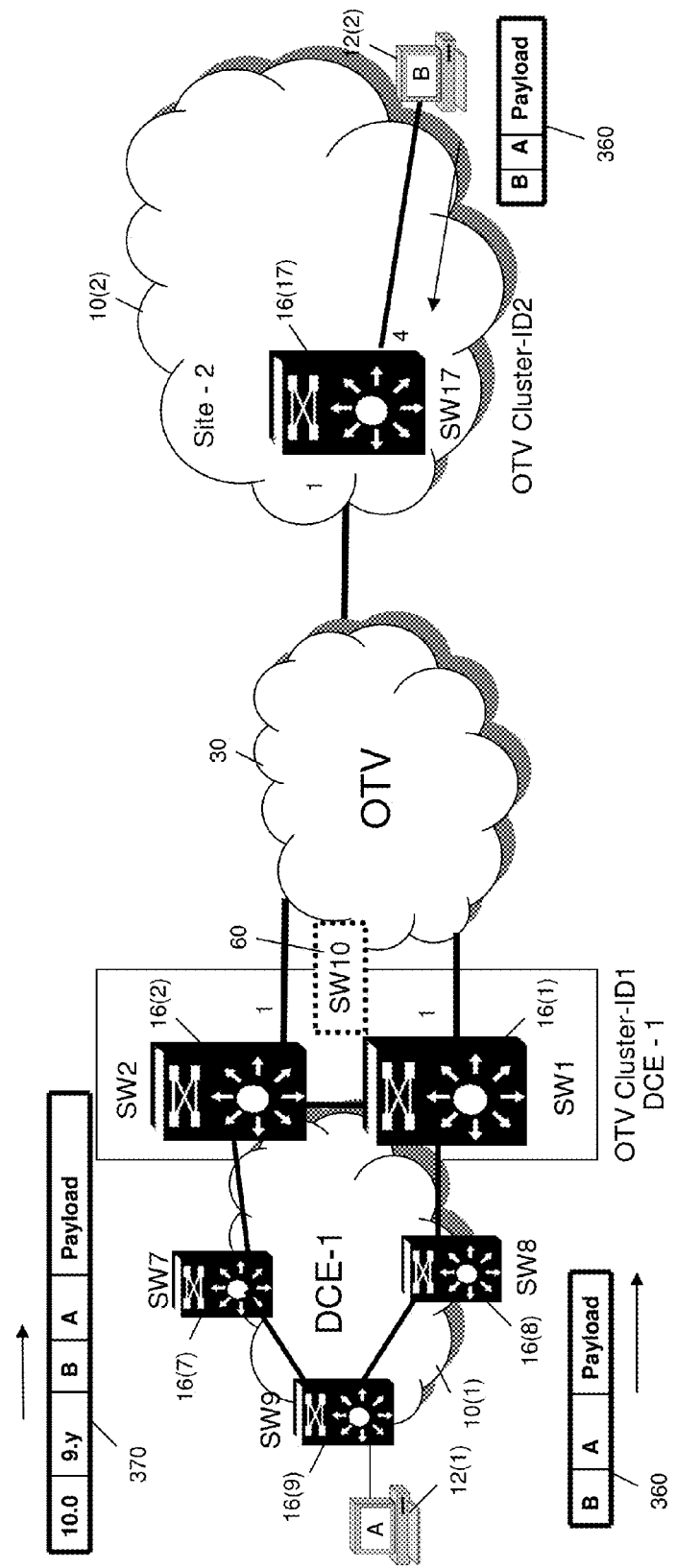
FIG. 15 is an example of a network diagram showing a data center site with an edge switch cluster similar to that shown in FIG. 10 and depicting a packet flow from the data center site with the edge switch cluster having the fictitious switch to another site.

With reference now to FIG. 15, a diagram is shown for packet flow from endpoint device 12(1) to endpoint device 12(2). The FTs at the switches 16(1) and 16(2) and switch 16(17) are the same as those shown in FIGS. 13 and 14. In this example, the packet from endpoint 12(1) is shown at reference numeral 360. When switch 16(9) receives packet 360, it will forward it as packet 370 based on the emulated switch 60 and utilizing multipathing. Either switch 16(1) or switch 16(2) can receive the packet based on the flow-based hash computation in the L2 network, and the switch that receives the packet will forward it to the OTV cloud 30.

Figure 16:
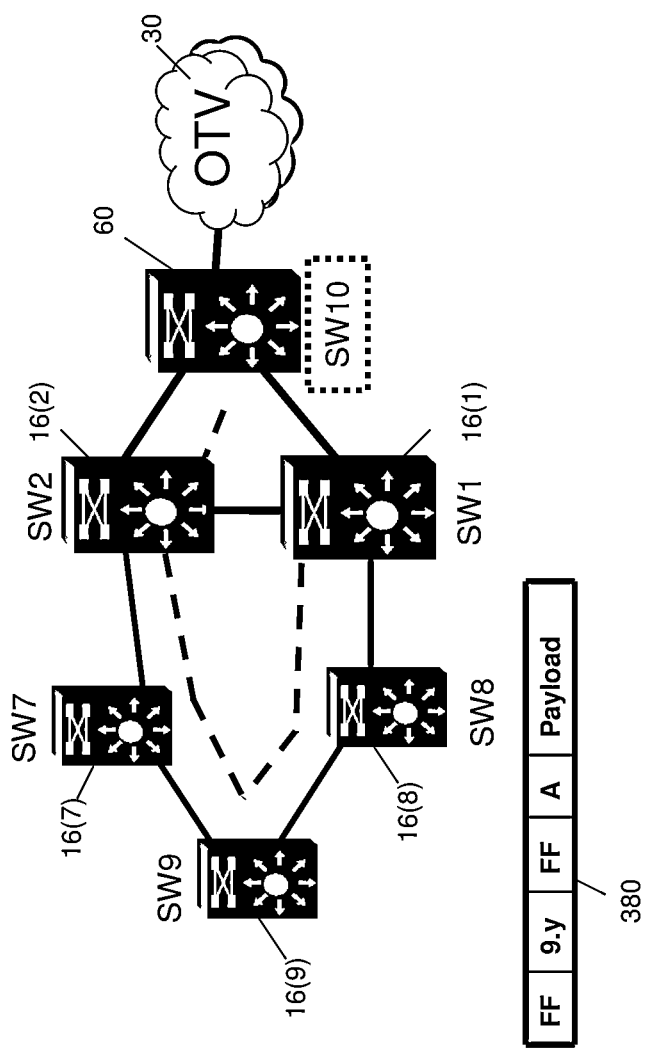
FIG. 16 is an example of a network diagram similar to that shown in FIG. 11 and illustrating handling of multi-destination packets at the edge switch cluster with the fictitious switch.

Reference is now made to FIG. 16 to describe multi-destination packet handling in the DCE network environment. FIG. 16 shows a logical topology similar to that shown in FIG. 11. Broadcast and multicast packets originating from the DCE network are forwarded in a loop-free tree built by the DCE control protocol, such as IS-IS. Both edge switches 16(1) and 16(2) will receive the multi-destination packets, an example of which is shown at 380, sent via switch 16(9). Due to the OTV AED mechanism, only one of the switches 16(1) and 16(2) will forward the packet into the OTV cloud 30. The other of the switches 16(1) and 16(2) will drop the packet.

Multi-Destination Packets Coming from OTV Cloud

For multicast packets, only the AED switch joins IGMP in the L3 network, so that only one of the switches 16(1) and 16(2) switch attracts multicast packets from the OTV cloud.

For broadcast traffic, both switches 16(1) and 16(2) will receive the packets but only the AED switch forwards it to the DCE L2 network. The AED switch marks the multi-destination packet as coming from the emulated switch 60 before forwarding the multi-destination packet into the DCE L2 network. This ensures correct learning within the DCE network.

The other OTV edge switch also receives the packet but does not forward it back to the OTV cloud due to self-forwarding check. The Open Systems Adapter (OSA) is the emulated switch 60 and not the AED switch.

Figure 17:
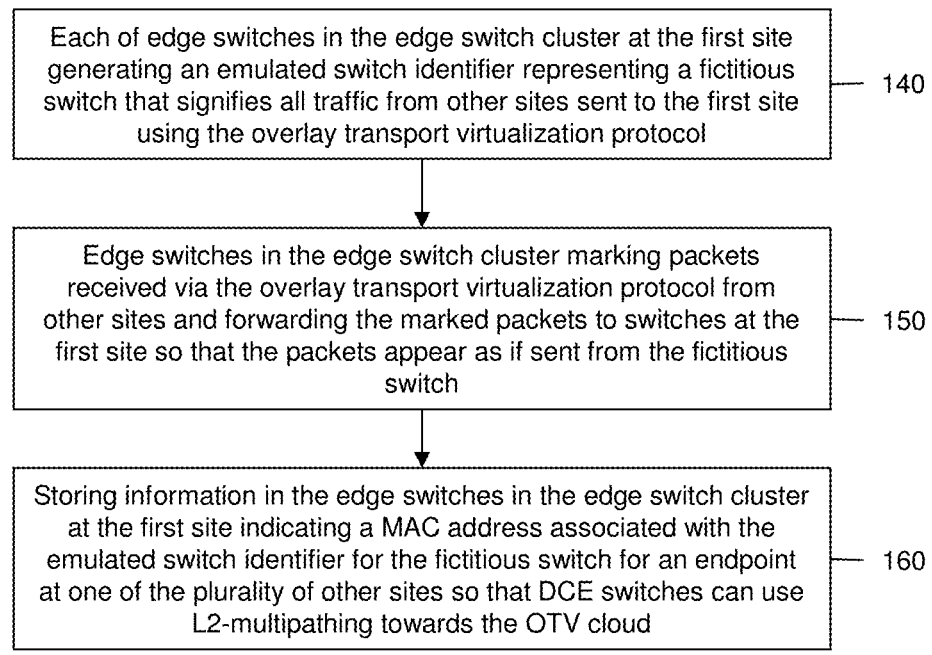
FIG. 17 is an example of a flow chart depicting operations performed in an edge switch in an edge switch cluster for the example scenarios depicted in FIGS. 12-16.

Reference now made to FIG. 17, operations of the process logic 100 in connection with the DCE network scenarios shown in FIGS. 12-16 are described. At 140, each of the edge switches in the edge switch cluster at a site, e.g., the first site, generates an emulated switch identifier representing a fictitious switch that signifies (attracts) all traffic from other sites sent to the first site using the OTV protocol. The emulated switch identifier is generated such that the fictitious switch is emulated to be directly connected behind the two or more edge switches at the first site so that switches at the first site can use Layer-2 multipathing via the fictitious logical switch and the edge switches in the edge switch cluster towards other sites via the overlay transport virtualization protocol. At 150, the edge switches in the edge switch cluster mark packets received via the overlay transport virtualization protocol from other sites and forward the marked packets to switches at the first site so that the packets appear as if sent from the fictitious switch. The marking of packets (with appropriate switch identifiers in packet headers) is described above in connection with FIGS. 12-15. At 160, the edge switchers in the edge switch cluster at a given site, e.g., the first site, store information indicating a MAC address associated with the emulated switch identifier for the fictitious switch for an endpoint device at one of the plurality of other sites.

In sum, a method is provided in which at an edge switch that is configured to operate in an active-active multi-homing mode with at least one other edge switch in an edge switch cluster at a first data center site that comprises one or more endpoint devices, information is stored indicating a media access control (MAC) address of at least one endpoint device at the first site. The edge switch at the first site communicates with at least one edge switch device at a second site using an overlay transport virtualization protocol that extends Layer-2 network connectivity to Layer-3 network connectivity over Internet Protocol (IP) between edge switches at a plurality of sites. The edge switch in the edge cluster at the first site sends, via the overlay transport virtualization protocol, a Layer-3 message that is configured to advertise the MAC address of the at least one endpoint at the first site to enable the at least one edge switch at the second site to perform multipath routing to the endpoint device at the first site based on each of the edge switches in the edge switch cluster at the first site.

In addition, an apparatus (e.g., an edge switch) is provided that comprises a network interface device configured to enable communications over a Layer-2 network and over a Layer-3 network; switch hardware configured to perform switching operations in the Layer-2 network and the Layer-3 network; and a processor configured to be coupled to the network interface device and to the switch hardware circuitry. The processor is configured to operate an edge switch in an active-active multi-homing mode with at least one other edge switch in an edge switch cluster at a first data center site that comprises one or more endpoint devices. The processor is further configured: to store information indicating a media access control (MAC) address of at least one endpoint device at the first site; generate messages to be transmitted and process received messages for communication between with at least one edge switch device at a second site using an overlay transport virtualization protocol that extends Layer-2 network connectivity to Layer-3 network connectivity over Internet Protocol (IP) between edge switches at a plurality of sites; and generate and send via the overlay transport virtualization protocol a Layer-3 message that is configured to advertise the MAC address of the at least one endpoint at the first site to enable the at least one edge switch at the second site to perform multipath routing to the endpoint device at the first site based on each of the edge switches in the edge switch cluster at the first site.

Further provided herein is one or more computer readable storage media encoded with software comprising computer executable instructions and when the software is executed operable to: at an edge switch that is configured to operate in an active-active multi-homing mode with at least one other edge switch in an edge switch cluster at a first data center site that comprises one or more endpoint devices, store information indicating a media access control (MAC) address of at least one endpoint device at the first site; generate messages to be transmitted and process received messages for communication between the edge switch at the first site and at least one edge switch device at a second site using an overlay transport virtualization protocol that extends Layer-2 network connectivity to Layer-3 network connectivity over Internet Protocol (IP) between edge switches at a plurality of sites; and generate and send via the overlay transport virtualization protocol from the edge switch in the edge switch cluster at the first site a Layer-3 message that is configured to advertise the MAC address of the at least one endpoint at the first site to enable the at least one edge switch at the second site to perform multipath routing to the endpoint device at the first site based on each of the edge switches in the edge switch cluster at the first site.

The foregoing techniques involve changes made only to the data center edge switches that are configured to support the OTV protocol. No changes are required in other L2 or service provider devices. No further requirements are placed on the service provider network and can be built easily on top of existing deployments. Existing failure and node resilience functionality provided by ECMP protocols such as (vPC or DCE) work naturally with these techniques.

The above description is intended by way of example only.

What is claimed is:

1. A method comprising:
   at a first edge switch that is configured to operate in an active-active multi-homing mode for packets within individual Virtual Local Area Networks (VLANs) with at least a second edge switch in an edge switch cluster at a first data center site that comprises one or more endpoint devices, receiving Layer-2 packets for a given VLAN from a first endpoint device in a Layer-2 network at the first data center site;
   communicating between the first edge switch and at least one edge switch at a second data center site using a transport protocol that extends Layer-2 network connectivity to Layer-3 network connectivity over Internet Protocol (IP) between edge switches at a plurality of sites, wherein the transport protocol comprises one of an overlay transport virtualization protocol and a Layer-3 protocol that enables multipath routing from the at least one edge switch to edge switches in the edge switch cluster;
   encapsulating the Layer-2 packets to obtain Layer-3 packets; and
   forwarding the Layer-3 packets to the at least one edge switch at the second data center site using the transport protocol, wherein the at least one edge switch at the second data center site is enabled to perform multipath routing for packets within the given VLAN to the first endpoint device such that packets within the given VLAN are routed via each of the first and second edge switches due to the first and second edge switches operating in the active-active multi-homing mode for packets within the given VLAN.

2. The method of claim 1, wherein communicating comprises sending a Layer-3 message from each of the first and second edge switches, the Layer-3 message comprising an identifier for the edge switch cluster at the first data center site, wherein the identifier is configured to enable a second endpoint device at the second data center site to use the identifier for sending Layer-2 packets to the first endpoint device so that the Layer-2 packets from the second endpoint device can be multipath routed by the at least one switch to the first endpoint device via the first and second switches in the identified edge switch cluster.

3. The method of claim 1, and further comprising:
receiving at the first edge switch Layer-3 packets within the given VLAN routed from the at least one edge switch at the second data center site to the first edge switch;
decapsulating the Layer-3 packets to obtain Layer-2 packets; and
forwarding the Layer-2 packets on a port in the Layer-2 network at the first data center site.

4. The method of claim 3, wherein the first and second edge switches at the first data center site are virtual port channel (vPC) peers, wherein a first vPC member port is coupled to the first edge switch and a second vPC member port is coupled to the second edge switch, and wherein forwarding the Layer-2 packets comprises forwarding the Layer-2 packets on the first vPC member port.

5. The method of claim 1,
wherein Layer-2 packets within the given VLAN are hashed within the Layer-2 network using a flow hash to distribute the Layer-2 packets within the given VLAN as separate packet flows across the first and second edge switches at the first data center site such that each of the first and second edge switches can act as an authoritative edge switch for their respective packet flows; and
wherein receiving the Layer-2 packets comprises receiving those Layer-2 packets that have been flow hashed into a packet flow for the first edge switch.

6. The method of claim 1, and further comprising designating one of the first and second edge switches as an authoritative edge switch for multi-destination traffic to and from the first data center site for each VLAN at the first data center site.

7. The method of claim 6, wherein designating comprises designating one of two or more edge switches in the edge switch cluster at the first data center site as the authoritative edge switch on a per VLAN basis for broadcast traffic to and from edge switches at other sites using the overlay transport virtualization protocol for Layer-3 connectivity.

8. The method of claim 6, wherein designating comprises designating one of the first and second edge switches as the authoritative edge switch on a per group basis for multicast traffic to and from edge switches at other sites using the overlay transport virtualization protocol for Layer-3 connectivity.

9. The method of claim 1, and further comprising the first edge switch generating an emulated switch identifier representing a fictitious switch that signifies all traffic from other sites sent to the first data center site using the transport protocol.

10. The method of claim 9, wherein the emulated switch identifier is generated such that the fictitious switch is emulated to be directly connected behind the first and second edge switches and so that switches at the first data center site can use Layer-2 multipathing via the fictitious switch and the first and second edge switches towards other sites via the overlay transport virtualization protocol.

11. The method of claim 10, and further comprising the first and second edge switches marking packets received via the overlay transport virtualization protocol from other sites and forwarding the marked packets to switches at the first data center site so that the packets appear as if sent from the fictitious switch.

12. An apparatus comprising:
a network interface device configured to enable communications over a Layer-2 network and over a Layer-3 network;
switch hardware circuitry configured to perform switching operations in the Layer-2 network and the Layer-3 network; and
a processor configured to be coupled to the network interface device and to the switch hardware circuitry, the processor configured to operate an edge switch in an active-active multi-homing mode for packets within individual Virtual Local Area Networks (VLANs) with at least one peer switch in an edge switch cluster at a first data center site that comprises one or more endpoint devices, the processor further configured to:
receive Layer-2 packets via the network interface device for a given VLAN from a first endpoint device in a Layer-2 network at the first data center site;
generate messages to be transmitted and process received messages for communication with at least one edge switch device at a second data center site using a transport protocol that extends Layer-2 network connectivity to Layer-3 network connectivity over Internet Protocol (IP) between edge switches at a plurality of sites, wherein the transport protocol comprises one of an overlay transport virtualization protocol and a Layer-3 protocol that enables multipath routing from the at least one edge switch to edge switches in the edge switch cluster;
encapsulate the Layer-2 packets to obtain Layer-3 packets; and
forward the Layer-3 packets to the at least one edge switch at the second data center site using the transport protocol, wherein the at least one edge switch at the second data center site is enabled to perform multipath routing for packets within the given VLAN to the first endpoint device at the first data center site such that packets within the given VLAN are routed via each of the edge switch and the at least one peer edge switch in the edge switch cluster at the first data center site due to the edge switch and the at least one peer switch operating in the active-active multi-homing mode for packets within the given VLAN.

13. The apparatus of claim 12, wherein the processor is further configured to designate one of the edge switch and the at least one peer edge switch as an authoritative edge switch for multi-destination traffic to and from the first data center site for VLANs at the first data center site.

14. The apparatus of claim 12, wherein the processor is further configured to:
receive Layer-3 packets within the given VLAN routed from the at least one edge switch at the second data center site,
decapsulate the Layer-3 packets to obtain Layer-2 packets; and forward the Layer-2 packets on a port in the Layer-2 network at the first data center site.

15. The apparatus of claim 14, wherein the processor is configured to operate with respect to the peer switch as virtual port channel (vPC) peers, wherein a first vPC member port is coupled to the edge switch and a second vPC member port is coupled to the peer edge switch, and to forward the Layer-2 packets on the first vPC member port.

16. The apparatus of claim 12, wherein the processor is further configured to generate an emulated switch identifier representing a fictitious switch that signifies all traffic from other sites sent to the first data center site using the transport protocol, and wherein the processor generates the emulated switch identifier such that the fictitious switch is emulated to be directly behind the edge switch and the peer edge switch and so that switches in the Layer-2 network at the first data center site can use Layer-2 multipathing via the fictitious switch, the edge switch and the peer edge switch towards other sites using the transport protocol.

17. The apparatus of claim 16, wherein the processor is further configured to mark packets received via the overlay transport virtualization protocol from other sites and forward the marked packets to switches at the first data center site so that the packets appear as if sent from the fictitious switch.

18. The apparatus of claim 12, wherein the processor is configured to generate and transmit a Layer-3 message from the edge switch, the Layer-3 message comprising an identifier for the edge switch cluster at the first data center site, wherein the identifier is configured to enable a second endpoint device at the second data center site to use the identifier for sending Layer-2 packets to the first endpoint device so that the Layer-2 packets from the second endpoint device can be multipath routed as Layer-3 packets by the at least one switch at the second data center site to the first endpoint device via the edge switch and the peer switch in the identified edge switch cluster.

19. One or more non-transitory computer readable storage media encoded with software comprising computer executable instructions and when the software is executed operable to:
at a first edge switch that is configured to operate in an active-active multi-homing mode for packets within individual Virtual Local Area Networks (VLANs) with at least a second edge switch in an edge switch cluster at a first data center site that comprises one or more endpoint devices, receive Layer-2 packets for a given VLAN from a first endpoint device in a Layer-2 network at the first data center site;
generate messages to be transmitted and process received messages for communication between the first edge switch and at least one edge switch device at a second data center site using a transport protocol that extends Layer-2 network connectivity to Layer-3 network connectivity over Internet Protocol (IP) between edge switches at a plurality of sites, wherein the transport protocol comprises one of an overlay transport virtualization protocol and a Layer-3 protocol that enables multipath routing from the at least one edge switch to edge switches in the edge switch cluster; and
encapsulate the Layer-2 packets to obtain Layer-3 packets; and
forward the Layer-3 packets to the at least one edge switch at the second data center site using the transport protocol, wherein the at least one edge switch at the second data center site is enabled to perform multipath routing for packets within the given VLAN to the first endpoint device such that packets within the given VLAN are routed via each of the first and second edge switches due to the first and second edge switches operating in the active-active multi-homing mode for packets within the given VLAN.

20. The one or more non-transitory computer readable storage media of claim 19, and further comprising instructions configured to designate one of the first and second edge switches as an authoritative edge switch for multi-destination traffic to and from the first data center site for VLANs at the first data center site.

21. The one or more non-transitory computer readable storage media of claim 19, and further comprising instructions configured to:
receive Layer-3 packets within the given VLAN routed from the at least one edge switch at the second data center site,
decapsulate the Layer-3 packets to obtain Layer-2 packets; and
forward the Layer-2 packets on a port in the Layer-2 network at the first data center site.

22. The one or more non-transitory computer readable storage media of claim 21, wherein the instructions are operable to operate the first edge switch with respect to the second edge switch as virtual port channel (vPC) peers, wherein a first vPC member port is coupled to the first edge switch and a second vPC member port is coupled to the second edge switch, and to forward the Layer-2 packets on the first vPC member port.

23. The one or more non-transitory computer readable storage media of claim 19, and further comprising instructions configured to generate an emulated switch identifier representing a fictitious switch that signifies all traffic from other sites sent to the first data center site using the transport protocol, and wherein the instructions that are operable to generate the emulated switch identifier comprise instructions to generate the emulated switch identifier such that the fictitious switch is emulated to be directly behind the first edge switch and the second edge switch and so that switches at the first data center site can use Layer-2 multipathing via the fictitious switch, the first edge switch and the second edge switch towards other sites via the transport protocol.

24. The one or more non-transitory computer readable storage media of claim 23, and further comprising instructions that are operable to mark packets received via the overlay transport virtualization protocol from other sites and forward the marked packets to switches at the first data center site so that the packets appear as if sent from the fictitious switch.

25. The one or more non-transitory computer readable storage media of claim 19, wherein the instructions that generate the Layer-3 message comprise instructions to generate and transmit a Layer-3 message from the first edge switch, the Layer-3 message comprising an identifier for the edge switch cluster at the first data center site, wherein the identifier is configured to enable a second endpoint device at the second data center site to use the identifier for sending Layer-2 packets to the first endpoint device so that the Layer-2 packets from the second endpoint device can be multipath routed as Layer-3 packets by the at least one switch at the second data center site to the first endpoint device via the first and second switches in the identified edge switch cluster.

* * * * *